Patented Jan. 31, 1928.

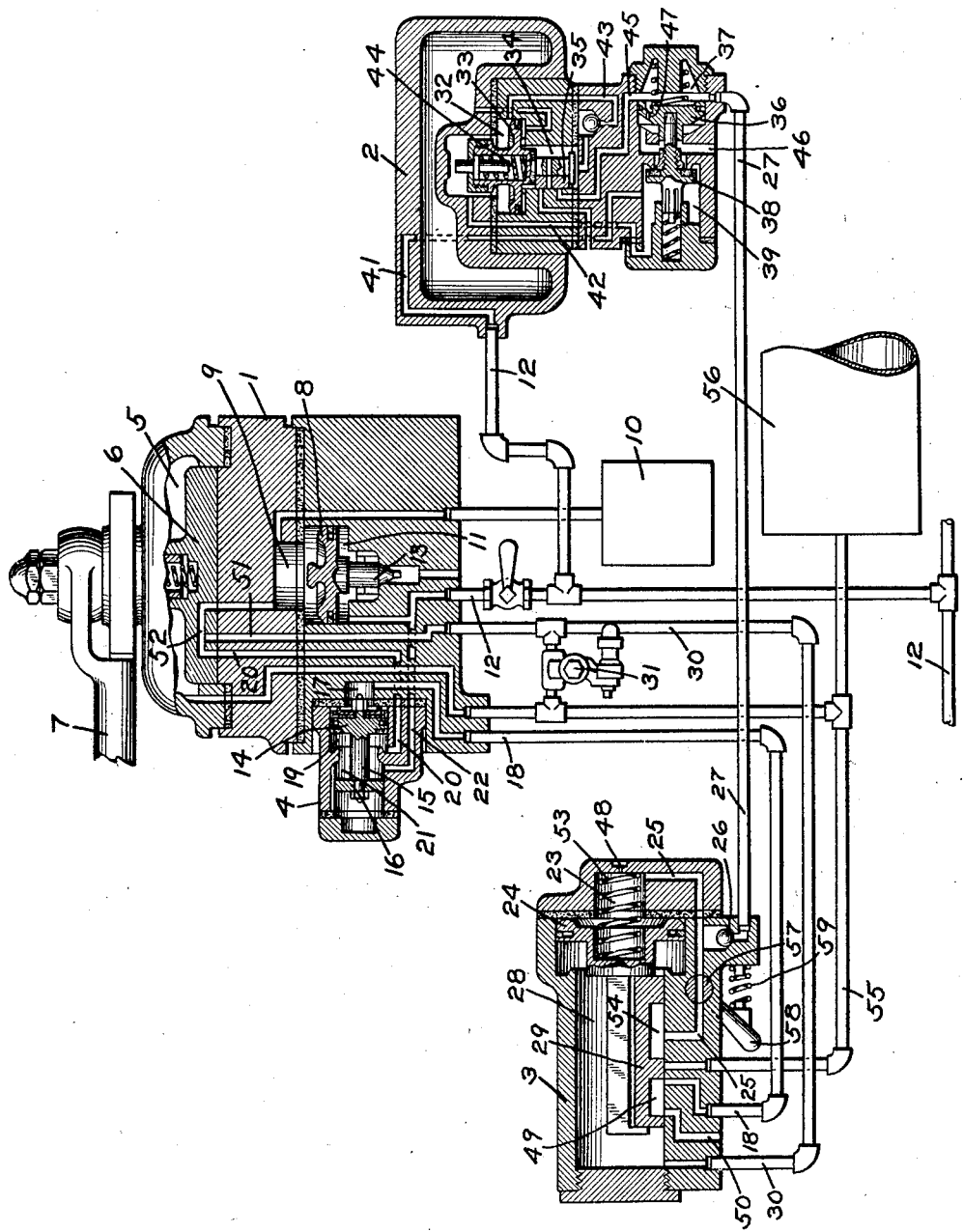

1,657,530

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed April 15, 1926. Serial No. 102,220.

This invention relates to fluid pressure brakes, and more particularly to the brake control equipment on the locomotive.

For controlling the fluid pressure brakes on a train, the locomotive is provided with a brake valve device, having a running position, in which fluid under pressure is supplied to the brake pipe through a feed valve device, to maintain the pressure in the brake pipe at a predetermined degree. The brake valve device also has a release position, in which fluid under pressure is supplied directly from the main reservoir to the brake pipe in order to effect the release of the brakes.

In case of a sudden reduction in brake pipe pressure, the brakes are applied in emergency, and the reduction in brake pipe pressure is serially propagated throughout the train by the well known quick serial action, produced by locally venting fluid from the brake pipe on each car of the train.

If the sudden reduction in brake pipe pressure is initiated at a point in the train other than by operation of the brake valve device, the brake valve will ordinarily be in running position, in which fluid is supplied to the brake pipe, and while the above emergency action to apply the brakes will occur, if the engineer does not promptly move the brake valve handle to lap position, so as to cut off the flow of fluid to the brake pipe, the brakes on the car at the head of the train and on the locomotive are liable to be released, by the continual flow of fluid to the brake pipe.

The principal object of my invention is to provide means for automatically cutting off the flow of fluid to the brake pipe at the brake valve when an emergency reduction in brake pipe pressure is produced, in order to prevent the release of the brakes.

In the accompanying drawing, the single figure is a diagrammatic view, with the principal parts in section, of a locomotive brake apparatus embodying my invention.

The apparatus shown in the drawing includes a brake valve device 1, a quick action vent valve device 2, a control valve device 3, and a fluid pressure supply cut-off valve device 4.

The brake valve device 1 comprises a casing having a valve chamber 5 containing the usual rotary valve 6 adapted to be operated by handle 7. Included in the brake valve casing is the usual equalizing discharge valve mechanism comprising a piston 8 having the chamber 9 at one side connected to an equalizing reservoir 10 and the chamber 11 at the opposite side connected to the brake pipe 12. Piston 8 is adapted to operate a discharge valve 13 for venting fluid from the brake pipe 12.

The supply cut-off valve device 4 is preferably incorporated in the brake valve device and comprises a valve piston 14 having a stem 15 connected to a guide member 16. The chamber 17 at one side of the valve piston 14 is connected to a pipe 18 leading to the control valve device 3 and chamber 19 at the opposite side is connected to a passage 20 which leads to the seat of rotary valve 6. In the normal position, as shown in the drawing, the chamber 19 is open to a chamber 21 which is connected to a passage 22 leading to the brake pipe 12.

The control valve device 3 comprises a casing having a piston chamber 23 containing a piston 24 and connected by a passage 25, containing a check valve 26 to a pipe 27, leading to the vent valve device 2. Valve chamber 28 at the opposite side of piston 24 contains a slide valve 29 adapted to be operated by piston 24 and is connected to a pipe 30 to which fluid under pressure is supplied by operation of the usual feed valve device 31.

The vent valve device 2 comprises a casing having a piston chamber 32 containing a piston 33 and a valve chamber 34 containing a slide valve 35 adapted to be operated by piston 33. The quick action venting portion of the vent valve device comprises a piston 36 contained in piston chamber 37 and a vent valve 38 contained in valve chamber 39 and adapted to be operated by piston 36.

In operation, the brake pipe 12 being connected with a passage 41 in the vent valve device 2, which leads to valve chamber 39, and valve chamber 39 being connected by passage 42 to piston chamber 32, said piston chamber is subject to brake pipe pressure. From piston chamber 32, fluid flows through passage 43 to valve chamber 34, and the fluid pressures on opposite sides of piston 33 being thus equalized, spring 44 maintains the piston and slide valve 35 in the normal position, as shown in the drawing.

In this position, slide valve 35 blanks passage 45, leading to piston chamber 37 and piston chamber 37 being open to the atmospheric port 46, through restricted port 47 in piston 36, the piston chamber and pipe 27 are maintained at atmospheric pressure, and opposite sides of piston 36 being at atmospheric pressure, the brake pipe pressure acting in valve chamber 39 on valve 38, holds said valve seated.

The piston chamber 23 of the control valve device 3 is open to the atmosphere through a restricted port 48, and since atmospheric pressure is present in pipe 27, the piston chamber 23 will be maintained at atmospheric pressure, so that fluid at feed valve pressure, as supplied through pipe 30 to valve chamber 28, acts on piston 24, to maintain same in the right hand position, as shown in the drawing.

In this position, pipe 18 is connected, through a cavity 49 in slide valve 29 with an atmospheric exhaust port 50, so that piston chamber 17 of the supply cut-off valve device 4 is now subject to fluid at atmospheric pressure, so that fluid at brake pipe pressure supplied to chamber 21, acts to maintain the valve piston 14 in its outer position, as shown. In this position, communication between passages 20 and 22 is open and thus fluid at the pressure supplied by the feed valve device 31, flows through passage 51 and cavity 52 in rotary valve 6, to passage 20 and thence through passage 22 to the brake pipe 12, thus maintaining the pressure in the brake pipe at the pressure of fluid supplied by the feed valve device, in the usual manner.

If a sudden reduction in brake pipe pressure should occur somewhere in the train, the brake pipe pressure in piston chamber 32 of the vent valve device 2 on the locomotive will be reduced and piston 33 will be shifted to its outer position by the pressure of fluid in valve chamber 34. Passage 45 is connected to valve chamber 34 by the corresponding movement of slide valve 35, so that fluid under pressure is supplied from said valve chamber to piston chamber 37. Piston 36 is then actuated by the fluid under pressure so supplied, so as to open the vent valve 38 and thereby effect a local venting of fluid from the brake pipe 12 to the exhaust port 46.

Fluid under pressure supplied to piston chamber 37 flows through pipe 27 to piston chamber 23 of the control valve device 3 and this pressure, assisted by spring 53 actuates piston 24, and moves slide valve 29 so that cavity 54 connects pipe 18 with a pipe 55, leading to the main reservoir 56.

Fluid at main reservoir pressure is then supplied to piston chamber 17 of the cut-off valve device 4 and valve piston 14 is thereby actuated so as to cut off communication between passages 20 and 22 and thus prevent the flow of fluid from the feed valve device 31 to the brake pipe 12. It will thus be seen that the apparatus operates automatically upon a sudden reduction in brake pipe pressure to cut off the flow of fluid to the brake pipe regardless of the position of the brake valve handle.

Cavity 54 in slide valve 29 also connects passage 25 with pipe 55, so that fluid at main reservoir pressure is supplied to piston chamber 23 and operates to maintain piston 24 in its inner position, regardless of the venting of fluid from said piston chamber by way of the restricted vent port 48.

Check valve 26 prevents back flow from piston chamber 23 to pipe 27, which might otherwise flow through passage 45 to the seat of slide valve 35 and tend to blow the slide valve off its seat.

In order to permit the release of the brakes after an emergency application of the brakes, a reset cock 57 is interposed in the passage 25 having an operating handle 58. When the handle 58 is turned from its normal position, communication through passage 25 is cut off, so that fluid under pressure is prevented from flowing from the main reservoir 56 to the piston chamber 23. The pressure in said piston chamber then quickly blows down through the port 48, permitting the fluid pressure in valve chamber 28 to shift piston 24 to its outer normal position, in which pipe 18 is again connected to exhaust port 50. Valve piston 14 is consequently shifted outwardly by the fluid pressure acting in chamber 21, so that communication is again established between passages 20 and 22. With the brake valve handle in release or running position, the brake pipe will be charged with fluid under pressure in the usual manner, so as to effect the release of the brakes.

When the handle 58 is released, a spring 59 operates thereon, to shift the handle back to its normal position.

Having now described my invention, what I claim as new and desire to secure by Letters Patent, is:—

1. In a fluid pressure brake, the combination with a brake pipe and a brake valve device for controlling a communication through which fluid under pressure is supplied to the brake pipe, of a cut-off valve device operated by fluid under pressure for closing said communication, a control valve device operated by fluid under pressure for supplying fluid to said cut-off valve device, and means operated upon a sudden reduction in brake pipe pressure for supplying fluid under pressure to said control valve device.

2. In a fluid pressure brake, the combination with a brake pipe and a brake valve device for controlling a communication through which fluid under pressure is supplied to the brake pipe, of a cut-off valve device for controlling said communication, a control valve device operated upon an increase in fluid pressure for effecting the operation of said cut-off valve device and for opening a communication through which fluid under pressure is supplied to said control valve device, and a manually operable valve for closing said communication.

3. In a fluid pressure brake, the combination with a brake pipe and a brake valve device having means for supplying fluid under pressure to the brake pipe, of a valve device operated upon an increase in fluid under pressure for cutting off communication through which fluid is supplied from the brake valve device to the brake pipe, and means operated upon a sudden reduction in brake pipe pressure for supplying fluid under pressure to said valve device.

In testimony whereof I have hereunto set my hand.

CLYDE C. FARMER.